United States Patent
Anderson et al.

(10) Patent No.: US 6,757,628 B1
(45) Date of Patent: Jun. 29, 2004

(54) MULTI-LEVEL TRANSFORMER AND LINE LOSS COMPENSATOR AND METHOD

(75) Inventors: Larry W. Anderson, Charlotte, NC (US); Michael K. Bearden, Waxhaw, NC (US); Guy H. Berthiaume, Charlotte, NC (US)

(73) Assignee: Landis+Gyr Inc., Lafayette, IN (US)

( * ) Notice: Subject to any disclaimer, the term of this patent is extended or adjusted under 35 U.S.C. 154(b) by 0 days.

(21) Appl. No.: 09/353,711

(22) Filed: Jul. 14, 1999

Related U.S. Application Data

(60) Provisional application No. 60/092,774, filed on Jul. 14, 1998.

(51) Int. Cl.[7] ............................................. G06F 17/60
(52) U.S. Cl. ............................ 702/85; 702/61; 705/412
(58) Field of Search ............................. 702/85, 61, 62, 702/64; 705/410, 412, 34; 706/306; 340/870.02

(56) References Cited

U.S. PATENT DOCUMENTS

| | | | | |
|---|---|---|---|---|
| 3,913,829 A | * | 10/1975 | Fink .............................. | 307/57 |
| 4,415,968 A | | 11/1983 | Maeda et al. ................. | 364/178 |
| 4,612,617 A | * | 9/1986 | Laplace et al. ................ | 702/60 |
| 4,868,410 A | | 9/1989 | Nakamura .................... | 307/20 |
| 4,979,122 A | | 12/1990 | Davis et al. .................. | 364/483 |
| 5,122,735 A | * | 6/1992 | Porter et al. ............. | 324/103 R |
| 5,181,026 A | | 1/1993 | Granville ................ | 340/870.28 |
| 5,243,537 A | * | 9/1993 | Neumann ...................... | 702/60 |
| 5,247,454 A | | 9/1993 | Farrington et al. .......... | 364/483 |
| 5,301,121 A | | 4/1994 | Gaverick et al. ............ | 364/483 |
| 5,517,422 A | * | 5/1996 | Ilic et al. ....................... | 307/57 |
| 5,517,423 A | | 5/1996 | Pomatto ...................... | 364/492 |
| 5,548,209 A | * | 8/1996 | Lusignan et al. ............ | 324/142 |
| 5,608,646 A | | 3/1997 | Pomatto ...................... | 364/492 |
| 5,694,329 A | | 12/1997 | Pomatto ...................... | 364/492 |
| 5,842,187 A | * | 11/1998 | Williams ...................... | 702/61 |
| 5,999,921 A | * | 12/1999 | Arsenault et al. ........... | 705/410 |
| 6,351,737 B1 | * | 2/2002 | Williams ...................... | 705/34 |

OTHER PUBLICATIONS

Macqueen et al. "An Algorithm for the Allocation of Distribution System Demand and Energy Losses." IEEE Transactions on Power Systems, vol. 11, No. 1, Feb. 1996.*

Macqueen et al. "Allocation of Distribution System Losses to Consumers in Deregulated Electricity Supply Industries." Power System Control and Management, Apr. 16–18, 1996, Conference Publication No. 421 1996.*

* cited by examiner

Primary Examiner—Kamini Shah
(74) Attorney, Agent, or Firm—Maginot, Moore & Beck

(57) ABSTRACT

A compensator for use in connection with the metering of electricity calculates multi-level losses due to loss devices such as transformers and transmission lines. The compensator calculates losses to delivered electricity due to the presence of such loss devices and can sum losses from multiple loss devices to determine the electricity being delivered at various points, or levels, in the transmission system.

11 Claims, 11 Drawing Sheets

MULTI-LEVEL TRANSFORMER AND LINE LOSS COMPENSATOR AND METHOD

CROSS-REFERENCE TO RELATED APPLICATION

This application claims the benefit of U.S. provisional patent application Serial No. 60/092,774, filed Jul. 14, 1998.

FIELD OF INVENTION

This invention relates to an electrical energy meter such as used by power generation and transmission companies, and, more particularly, to a revenue accuracy meter and meter system that calculates multi-level energy losses.

BACKGROUND OF INVENTION

Utility power distribution generally is divided into three segments: generation, transmission and distribution. More particularly, power is generated by a power generation facility, i.e., a power generator or power plant. The power generator supplies power through step-up subtransmission transformers to transmission lines. To reduce power transportation losses, the step-up transformers increase the voltage and reduce the current. The actual transmission line voltage conventionally depends on the distance between the subtransmission transformers and the users or customers.

Distribution substation transformers reduce the voltage from transmission line level to generally a range of about 2–35 kV. The primary power distribution system delivers power to distribution transformers that reduce the voltage still further, i.e., to about 120 V to 600 V.

Prior to electric utility deregulation, one entity or "electric utility" usually owned the power generation, transmission and distribution segments. This utility would charge its customers according to the amount of energy the customer used. Energy usage could be determined by metering the usage at the customer's location. Such metering was relatively simple and inexpensive because of the low voltages at these metering locations.

Electrical utilities would account for energy losses during transmission and distribution when calculating its rate structure. In other words, the utility would allocate the energy losses between its customers, thereby charging each customer a fair portion for the energy losses that occurred in transmitting the energy to the customer.

Utility deregulation, however, allows for separate ownership of the individual segments (and sub-segments) of a power generation, transmission and distribution system. Thus, one entity may own and maintain a power generation facility, which delivers energy to a transmission system that may be owned and maintained by another entity, which then delivers energy to a distribution system which may be owned and maintained by yet another entity.

Consequently, it is important that each entity know the exact amount of energy being supplied by it to another company (or received from another company). In other words, the power generator should know the amount of energy it is supplying to the transmission company and the transmission company should know the amount of energy it is supplying to the distribution company. Therefore, it is important to know the amount of energy being delivered at each point of delivery to each entity. This way, each entity knows the amount of energy it is selling or receiving at the various points of delivery throughout the system.

However, there are usually high voltages at these points of delivery, such as after step-up transformers and along transmission lines. Thus, because of the high voltages, it is difficult and expensive to connect a meter at such points to monitor the energy values. In addition, by adding additional meters and transformers to such systems, maintenance becomes more difficult and reliability may decrease.

Metering at different locations is also important because of energy losses that occur during transmission and distribution. Specifically, transformers and transmission lines cause the majority of energy losses during transmission and distribution. Moreover, each entity itself consumes energy in its day to day activities, such as for lighting, controls and heating. It is important to account for these losses since, with deregulation, it becomes important to know the exact amount of energy that is delivered at different points of delivery along the system.

Consequently, and especially with deregulation, there is a need for better management and accounting of energy supply and delivery. There is also a need to determine the amounts of energy being delivered at different points in a generation, transmission and distribution system, without increasing the number of meters in the system. There is also a need for the simplification of energy metering.

Moreover, each supplier, user and deliverer should be able to communicate with each other, and transfer information regarding the quantity, and, if desired, the quality, of the energy being transferred into and out of their particular portion of the generation and transmission system. Thus, the management, accounting and metering of energy is becoming more and more important.

Accordingly, it is desirable to provide an inexpensive and reliable metering device that provides information about energy being delivered at different points in a utility generation and transmission system. Moreover, it is desirable to eliminate meters, or the need for meters, at certain locations in utility transmission and distribution systems.

SUMMARY OF INVENTION

The present invention advantageously provides a loss compensator for use in or in connection with an electronic revenue access meter to provide it with the means to calculate energy losses associated with equipment and transmission lines in a transmission system. The loss constants associated with this equipment and transmission lines are available to the compensator, or are preferably pre-stored in the compensator. A meter coupled to the compensator preferably communicates with other meters in the system to net the available supply of energy at the first level of the system. Losses for the second level are then subtracted from this net, which results in a calculation of the net energy available at the second level or second point in the system, downstream of the equipment and/or lines that caused the losses. Losses for a third level are then subtracted from this second net, to arrive at the net energy available at a the third level, and so on.

The present invention thus provides a compensator for computing compensation level losses in an electrical energy transmission system that includes devices to which electrical energy losses can be attributed, i.e., "loss devices" such as transformers or transmission lines. The compensator is coupled to a meter located at a first point in the system and in communication with at least one other meter, each such meter at a respective point at the system distal from the first point. The compensator comprises at least one totalizer programmed to receive at least one input relating to a measure of electricity information, to compute a total value of that electricity information, and to output that value. The compensator further comprises a memory device containing at least one loss constant corresponding to a loss device. In, addition, the compensator comprises a loss calculator coupled to the at least one totalizer for receiving an output from the totalizer, and coupled to the memory device for receiving the at least one loss constant from the memory device, and programmed for computing an electrical energy loss value based on the outputs received from the totalizer of totalizers and from the memory device.

The present invention further provides for a compensation method for use in an electrical energy meter coupled to an electrical energy network including loss devices. The energy meter makes at least one measurement relating to electrical energy, and the method compensates the at least one measurement for electrical energy loss due to at least one of the loss devices. This method according to the present invention comprises the steps of selecting a compensation level of the network, determining whether a compensation corresponding to the selected level is to be made to the at least one measurement relating to electrical energy, totalizing the electrical energy measure for at least one of the loss devices, and calculating, based on the result of the totalization step, a loss for the selected level and attributable to the at least one loss device.

A meter coupled to the compensator the present invention thus eliminates the need for additional meters in certain areas of the system, thereby decreasing costs and increasing reliability. A meter coupled to the compensator of the present invention provides detailed information to selected users, customers, managers, and the like, about available energy and losses for multiple levels of the system. In other words, the meters having such a compensator are preferably accessible by suppliers, users, utilities, managers and the like, thereby making usage, losses and metering information available for accounting, study, management, etc.

Consequently, multi-level meters coupled to compensators of the present invention allow power generation facilities and/or utilities to easily and reliably manage and meter the quantity and quality of the energy being delivered and transferred at different locations or levels in a transmission system.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principals of the invention.

DETAILED DESCRIPTION OF THE PREFERRED EMBODIMENT

Figure 1:
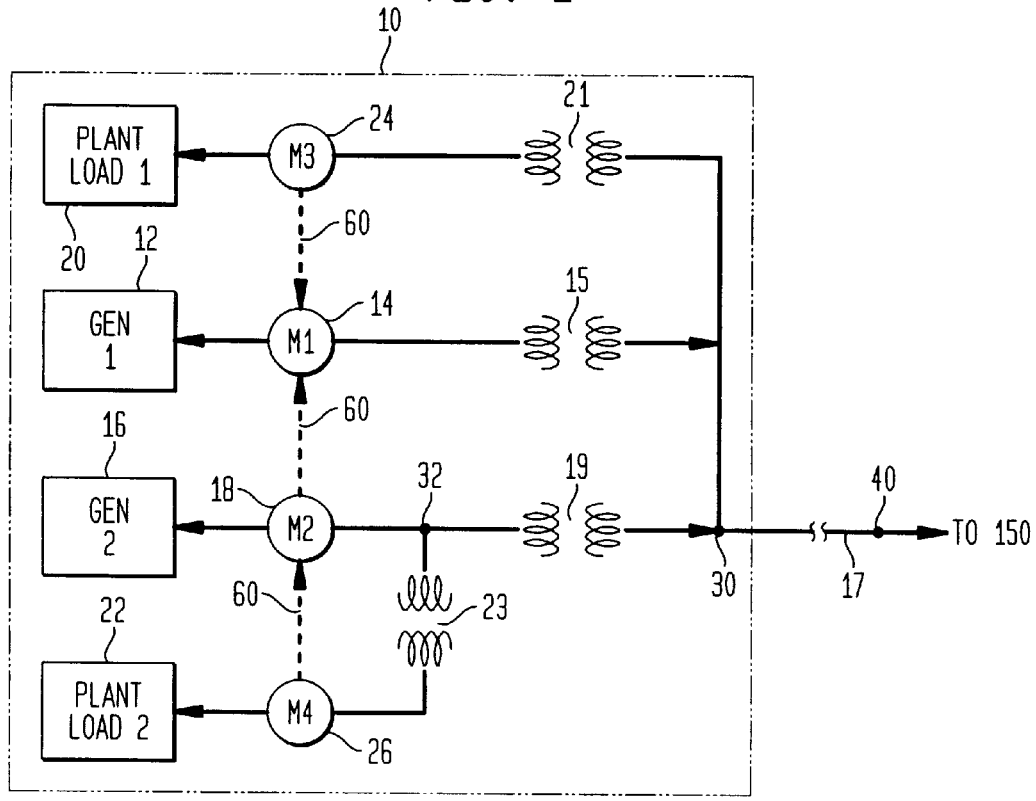
FIG. 1 schematically illustrates an environmental view of a generation and transmission system.

Referring to FIG. 1, a block diagram of a representative power generation and transmission system is shown. A power generation plant as is known in the art is shown at 10. A first generator 12 produces electrical energy, which is metered by meter 14. Step-up transformer 15 increases the voltage and decreases the current from generator 12 for transmission over transmission line 17. This decreases transmission losses associated with transmitting energy over long distances.

An optional second generator 16 also produces electrical energy, which is metered by meter 18. Step-up transformer 19 increases the voltage and decreases the current from generator 16 for transmission over transmission line 17.

Since the plant consumes electricity, for example, for lighting, heating, controls and equipment, the electricity produced by the generators is returned to the plant for consumption, which is indicated by plant loads 20 and 22. The electricity for load 20 is supplied from the high voltage side of step-up transformers 15 and 19. It is therefore stepped-down via transformer 21 to an appropriate voltage. The electricity consumed by load 20 is metered by meter 24.

Load 22 consumes electricity when optional generator 16 is on-line. This electricity is supplied from the low voltage side of transformer 19. Transformer 23 lowers this voltage further to an appropriate voltage level. The electricity consumed by load 22 is measured by meter 26.

The electricity supplied by plant 10 is transmitted over transmission line 17 to an independent system operator ("ISO"), other customer, transmission system, distribution system, or the like. The electricity is thereafter delivered to a substation (not shown), where the voltage is stepped down via a transformer (not shown) for use by customers.

The amount of electricity delivered by plant 10 to transmission line 17 at point 30 is less than the amount of electricity generated by generators 12 and 16. This is due to consumption by loads 20 and 22, and also because of losses attributable to transformers 15, 19, 21 and 23. Moreover, the amount of electricity delivered at point of delivery 40 is less than the amount of electricity delivered at point 30. This is due to transmission losses attributable to line 17.

In the past, these losses were largely ignored since the generation plant, transmission system and distribution system were usually commonly owned or operated. This way, the losses could be equitably apportioned among the ultimate customers using a rate structure. With deregulation, however, there are interim customers purchasing electricity in bulk from different suppliers and transmission systems. Thus, it is important to know the amount of electricity being supplied at various points of delivery.

For billing and management purposes, plant 10, the owner of transmission line 17, and the ISO should know the amount of electricity being delivered at points 30 and 40. Of course, as persons skilled in the art will appreciate, the system of FIG. 1 is shown for exemplary purposes. It could apply to a generation plant that is delivering electricity to a transmission system at point 40 (e.g., the transmission system is the ISO), or, as explained above, the system of FIG. 1 may apply to a generation plant delivering electricity to a transmission system at point 30, and then to a distribution system at point 40 (e.g., the distribution system is the ISO). In either case, as persons skilled in the art will appreciate, for billing, accounting and management purposes, it is important to know the amount of electricity being delivered to the ISO or other customer at point 40, and, if desired, at point 30 as well. Placing a physical meter at location 40 or 30, however, would be difficult and expensive due to the high voltages at these locations.

Moreover, as persons skilled in the art will appreciate, the multi-level and line-loss meter calculations of the present invention can be used for any generation, transmission and distribution system.

As indicated by the dashed lines 60 in FIG. 1 connecting meters 14, 18, 24 and 26, and as explained further below, meters 14, 18, 24 and 26 communicate with each other. Furthermore, at least one of these meters is capable of calculating the amount of electricity being delivered at billing point 40. This requires a calculation of the losses associated with the transformers 15 and 19 and transmission line 17, which must be deducted from the amount of electricity being produced by generators 12 and 16. The electricity being consumed by loads 20 and 22, and the losses attributable to transformers 21 and 23 must also be deducted. This results in the net electricity being delivered at point 40 without having placed a physical meter at the location. This reduces costs and increases efficiency and reliability.

Meters 14, 18, 24 and 26 are preferably revenue accuracy meters that are electricity meters or alternating current static watt-hour meters used for billing functions, i.e., a billing meter. These revenue power or electricity meters preferably are solid state meters that at least meet American National Standards Institute ("ANSI") 12.16, International Electromechanical Commission ("IEC") 687/1036 standard, similar standards or improved standards, or the like, as understood in the art.

Consequently, as is well understood in the art, meters 14, 18, 24 and 26 are each coupled to a respective line for monitoring voltage, and, if desired, current. Using this information, each meter preferably calculates KWH (kilowatts per hour), KVARHs (kilovars per hour), I2H (current squared per hour) and V2H (voltage squared per hour), as is known in the art. Also, as is understood in the art, meters 14, 18, 24 and 26 would be applicable to single-phase, three-phase or other multi-phase electrical power signals.

Figure 2:
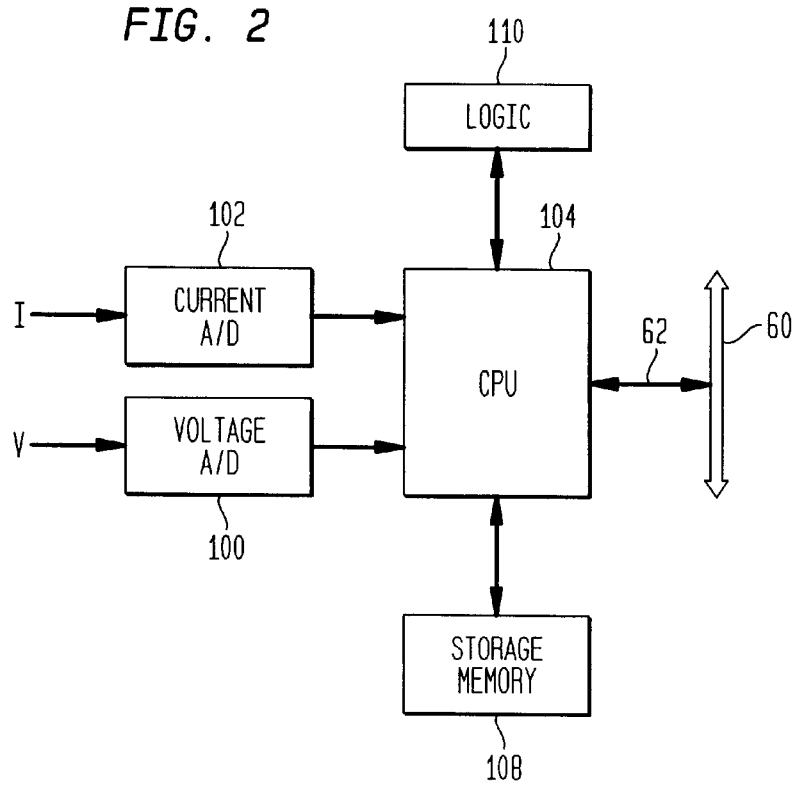
FIG. 2 schematically illustrates a block diagram of a meter that calculates multi-level losses in accordance with the preferred embodiment of the present invention.

Each meter monitors analog voltage and, if desired, current values from its respective line and then samples and converts the analog signals to digital signals. FIG. 2 shows a schematic block diagram of a representative meter capable of performing the multi-level transformer and line-loss calculations of the present invention.

The monitored analog voltage and current values are sent to voltage A/D converter 100 and current A/D converter 102. These values are available to main meter processor 104. A communication bus 62 is also coupled to processor 104.

Processor 104 is also coupled to a memory 108 and to logic 110. Logic 110 performs the multi-level transformer and line loss calculations, as explained further below. The loss constants of associated equipment, such as transformers 15 and 19 and transmission line 17 are stored in memory 108. Memory 108 is accessible to selected users via bus 60 so that they can revise, review or update these loss constants.

Communication bus 62 is coupled to bus 60 so that processor 104 can communicate with other meters. More particularly, processor 104 receives energy information from meters 14, 18, 24 and 26 so that it can perform summations, thereby netting the available energy. Losses are then subtracted from this net to arrive at a calculated or compensated energy that is available at delivery point 40.

Preferably, the multi-level and line-loss calculations of the present invention are performed by meter 14, although any other meter in the system, or combination of meters, could make the calculations, including meters 18, 24 and 26. In fact, meter 18 preferably is also capable of making these multi-level calculations for situations where generator 12 is off-line and generator 16 is on-line.

Generally, and as explained in more detail below, these multi-level calculations operate as follows. Meter 24 monitors the electricity being consumed by plant load 20. This electricity is being supplied from point 30 via transformer 21. Meter 24 calculates the losses attributable to transformer 21, sums these losses with the electricity it is metering, and then forwards the result to meter 14. This result is the amount of electricity being delivered to transformer 21 from point 30.

Meanwhile, meter 26 monitors the electricity being consumed by plant load 22. This electricity is being supplied from point 32 (the low voltage side of transformer 19) via transformer 23. Meter 26 calculates the losses attributable to transformer 23, sums these losses with the electricity it is metering, and then forwards the result to meter 18. This result is the amount of electricity being delivered to transformer 23 from point 32.

Meter 18 then determines the amount of electricity being supplied on the high voltage side of transformer 19, e.g., the amount of electricity being delivered to point 30 from generator 16. To accomplish this, meter 18 must calculate the losses attributable to transformer 19. To calculate these losses, meter 18 must know the amount of power (current and voltage) being delivered to transformer 19. To determine this information, it sums or nets the electricity it is monitoring with the electricity information it received from meter 26. This is the net electricity supplied to transformer 19 from point 32. Using this net electricity from point 32, meter 18 determines the losses of transformer 19 and then sums these losses with the net electricity from point 32. Meter 18 has thus calculated the amount of net electricity being delivered to point 30 from generator 16. Meter 18 supplies this information to meter 14 via communication bus 60.

Meter 14 then calculates the amount of electricity supplied to transmission line 17 at point 30. It does this by using the electricity information it meters to calculate the losses attributable to transformer 15. It then subtracts these losses from the electricity information it monitors. This results in the net electricity being supplied from transformer 15 to point 30.

Meanwhile, meter 24 monitors the electricity being consumed by plant load 20. This electricity is being supplied from point 30 via transformer 21. Meter 24 calculates the losses attributable to transformer 21, sums these losses with the electricity it is metering, and then forwards the result to meter 14. This result is the amount of electricity being delivered to transformer 21 from point 30.

Meter 14 then determines the amount of electricity being delivered from point 30 to transmission line 17 by summing: (i) the electricity information it calculated (i.e., the electricity being supplied from transformer 15 to point 30), (ii) the electricity information it received from meter 24 (i.e., the electricity being supplied from point 30 to load 20), and (iii) the electricity information it received from meter 18 (i.e., the electricity being supplied to point 30 from transformer 19).

Finally, meter 14 determines the electricity being delivered to point 40. It accomplishes this by calculating the losses attributable to transmission line 17. It then subtracts these losses from the electricity being delivered at point 30 to the transmission line.

Figure 3:
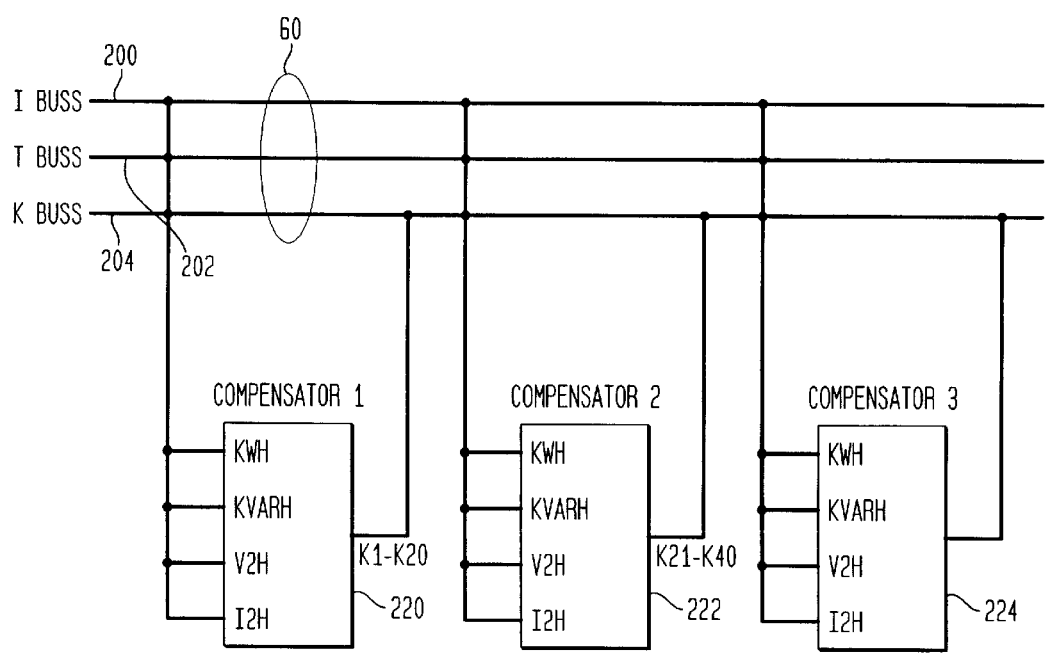
FIG. 3 is a schematic diagram of a meter that calculates multi-level losses in accordance with the preferred embodiment of the present invention.

Turning to FIG. 3, a schematic block diagram of meter 14 is shown.

Preferably, the schematic block diagram also depicts meters 18, 24 and 26 (in that each meter is preferably capable of making multi-level and line-loss calculations). For reference purposes, the following definitions are used:

TOTAL KWH—Sum of all KWH inputs for a given compensation level. Depending on how setup, the inputs are either added or subtracted.

TOTAL KVARH—Sum of all KVARH inputs for a given compensation level. Depending on how setup, the inputs are either added or subtracted.

FILT KWH—TOTAL KWH averaged in with the previous 'n' KWH samples (Rolling Average).

FILT KVARH—TOTAL KVARH averaged in with the previous 'n' KVARH samples (Rolling Average).

TOTAL $V^2H$—Sum of 1, 2, or 3 $V^2H$ inputs. Inputs are added. The source is either from the meter input bus or from a previous compensation level.

NORM $V^2H$—Total $V^2H/PT^2$. Normalized $V^2H$ is obtained by dividing the total $V^2H$ by the potential transformer (PT) ratio squared.

FILT $V^2H$—NORM $V^2H$ averaged in with the previous 'n' NORM $V^2H$ samples (Rolling Average).

FILT $V^4H$—(FILT $V^2H$)2/H. FILT $V^4H$ is obtained by squaring FILT V2H then dividing by hours to get the correct units—(H instead of $H^2$).

FILT $I^2H$—This value is either read from the meter inputs or calculated. If read from the meter inputs, then it is obtained the same way as FILT $V^2H$ ($I^2H$ inputs (Total $I^2H$ (NORM $I^2H$ (FILT $I^2H$) NORM $I^2H$ is obtained by dividing the total $I^2H$ by the current transformer (CT) ratio squared.

If FILT $I^2H$ is calculated, then it is obtained using:

$$FILT\ KVAH^2 = (FILTKWH)^2 + (FILTKVARH)^2$$

$$FILTI^2H = FILTKVAH^2/FILTV^2H \times 10^6 \times 1/(CT \times PT)$$

The $10^6$ term is to make up for the fact that the energy is in 'K' WATTS and 'K' VARS.

The 1/(CT×PT) puts the FILTKVAH term on the same scale as FILT $V^2H$.

If FILTI$^2$H is calculated, but FILTV$^2$H is zero, then FILTI$^2$H is set to zero too to avoid a divide by zero condition.

KWH Cu LOSS—FILT $I^2H \times$ KWH Cu loss constant. This is the load energy loss. The algebraic sign of the loss constant determines which direction the loss applies to. A user will add losses to energy used; a supplier will subtract losses from energy delivered.

KVARH Cu LOSS—FILT $I^2H \times$ KVARH Cu loss constant. This is the load reactive loss. The algebraic sign of the loss constant determines which direction the loss applies to. A user will add losses to energy used; a supplier will subtract losses from energy delivered.

KWH Fe LOSS—FILT $V^2H \times$ KWH Fe loss constant. The algebraic sign of the loss constant determines which direction the loss applies to.

KVARH $Fe^2$ LOSS—FILT $V^2H \times$ KVARH $Fe^2$ loss constant. This formula applies to transformer losses. Note that FILT $V^2H$ is used.

KVARH $Fe^4$ LOSS—FILT $V^4H \times$ KVARH $Fe^4$ loss constant. This formula applies to line losses. Note that FILT $V^4H$ is used.

Fe COMP KWH—FILT KWH+KWH Fe loss. The KWH value compensated by losses due only to $V^2$.

Fe COMP KVARH—FILT KVARH+KVARH $Fe^2$ loss+ KVARH $Fe^4$ loss. The KVARH value compensated by losses due only to $V^2$ and $V^4$.

Fe COMP $KVAH^2$—(Fe COMP $KWH)^2$+(Fe COMP $KVARH)^2$. $KVAH^2$ compensated by iron losses only (i.e. losses due to voltage).

COMP KWH—Fe COMP KWH+KWH Cu loss. The KWH value after full compensation.

COMP $KVAH^2$—(COMP $KWH)^2$+(COMP KVARH)2. Compensated KVAH2.

COMP KVARH—Fe COMP KVARH+KVARH Cu loss. The KVARH value after full compensation.

COMPKVAH—$\sqrt{COMPKVAH^2}$. Compensated KVAH.

COMPV2H—If FeCOMPKVAH$^2$ is >0 then $$COMPV^2H = (FILTV^2H \times PT)^{(\#\ of\ V^2H\ inputs)} \times COMPKVAH^2/FeCOMPKVAH^2$$

Else $$COMPV^2H = (FILTV^2H \times PT^2)/(\#\ of\ V^2H\ inputs)$$

This value is the voltage on the other side of the loss device, but the value is scaled down by the transformer ratio squared. This value is suitable to use as input to the next level of compensation.

CORR $V^2H$—COMPV$^2H \times$Transformer Ratio$^2$. Actual voltage on the other side of the loss device.

COMP NET DEL KWH—COMP KWH after performing hysteresis operation. This is a signed value with positive indicating delivered active energy.

COMP DEL KWH—Compensated delivered KWH. This is the absolute value of COMP NET DEL KWH only if COMP NET DEL KWH is >0. The value is zero otherwise.

COMP REC KWH—Compensated received KWH. This is the absolute value of COMP NET DEL KWH only if COMP NET DEL KWH is <0. The value is zero otherwise.

COMP NET DEL KVARH—COMP KVARH after performing hysteresis operation. This is a signed value with positive indicating delivered reactive energy.

COMP DEL KVARH—Compensated delivered KVARH. This is the absolute value of COMP NET DEL KVARH only if COMP NET DEL KVARH is >0. This value is zero otherwise.

COMP REC KVARH—Compensated received KVARH. This is the absolute value of COMP NET DEL KVARH only if COM NET DEL KVARH IS <0. This value is zero otherwise.

COMP Q1 KVARH—Compensated quadrant I KVARH. This is the absolute value of COMP NET DEL KVARH only if:

COMPNET DEL KVARH >0 and

COMPNET DEL KWH >0

This value is zero otherwise.

COMP Q2 KVARH—Compensated quadrant II KVARH. This is the absolute value of COMP NET DEL KVARH only if:

COMPNET DEL KVARH >0 and COMPNET DEL KWH <0

This value is zero otherwise.

COMP Q3 KVARH—Compensated quadrant III KVARH. This is the absolute value of COMP NET DEL KVARH only if:

COMPNET DEL KVARH <0 and

COMPNET DEL KWH <0

This value is zero otherwise.

COMP Q4 KVARH—Compensated quadrant IV KVARH. This is the absolute value of COMP NET DEL KVARH only if:

COMPNET DEL KVARH <0 and

COMPNET DEL KWH >0

This value is zero otherwise.

In FIG. 3, communication bus 60 is shown comprising three separate sub-busses IBUSS 200, TBUSS 202 and KBUSS 204. IBUSS 200 carries to input signals from and to meters 14, 18 and 24 and 26. More particularly, IBUSS carries KWHs, KVARH, $V^2H$ and $I^2H$ (when metered) signals from each meter. IBUSS may also carry auxiliary signals. TBUSS 202 carries totalized signals, as explained further below. KBUSS 204 carries compensated signals or the output of compensators 220; 222 and 224. The compensators perform the loss calculations and summations, also explained further below.

In FIG. 3, three levels of compensators are shown, representing three levels of losses. Of course, any level of losses may be calculated by adding or subtracting the appropriate number of compensators. In fact, in the example illustrated in FIG. 1, meter 14 performs two levels of compensation and thus the third compensator 224 is not used.

Initially, meter 26 calculates the losses associated with transformer 23. It does this by taking the power information it meters off of the IBUSS 200 and then uses this information to calculate the loss due to transformer 23 (in its own compensator—not shown). The losses are added to the information metered by meter 26 to arrive at a compensated value, and this information is placed on the KBUSS 204 for use by meter 18.

Meter 18 then determines the power being supplied to point 30 by generator 16. It does this by subtracting the power information received from meter 26 via the KBUSS 204 from the information it is metering (in its own compensator—not shown). This is the power available at point 32. The resulting power information is used to calculate the losses attributable to transformer 19. This loss is then subtracted from the power available at point 32. The result is the compensated amount of electricity being delivered at point 30 by generator 16 (after deducting the plant load 22 and transformer 19 and 23 losses). This compensated information is then placed on the KBUSS 204 by meter 18 for use by meter 14.

Like meter 26, meter 24 calculates the loss attributable to transformer 21. It does this by using the electricity information it meters to calculate the transformer 21 loss. The transformer loss is added to the metered information. Meter 24 then places this information on the KBUSS 204 for use by meter 14.

Meter 14 then calculates the next two levels of losses. The first being transformer 15 loss and the second being transmission line 17 loss. Compensator 220 uses the electricity information metered by meter 14, which is on the IBUSS 200, to calculate the transformer 15 loss. Compensator 220 then subtracts the loss from the information meter 14 is metering. This is the amount of electricity being delivered to point 30 by generator 12 (after deducting for transformer 15 losses). This information is placed on the KBUSS 204.

Meter 14 then determines the total amount of power available at point 30. This is the power being delivered to point 30 by generators 12 and 16 less plant loads 20 and 22, and transformer losses 15, 19, 21 and 23. Meter 14 does this in compensator 222 by totalizing the information it calculated (i.e., the power being delivered to point 30 by generator 12), with the information it received from meter 18 (the amount of power being delivered to point 30 by generator 16 less plant load 22 and transformer 19 and 23 losses) and meter 24 (the amount of power consumed by plant load 20 and transformer 21 loss). All of this information is available to meter 14 via the KBUSS 204. The totalized information, or the total amount of power being delivered to point 30 is then placed on the TBUSS 202 by meter 14.

Meter 14 then uses this totalized information from TBUSS 202 to calculate the losses attributable to transmission line 17. This is also performed in compensator 222. This loss is then subtracted from the totalized information, and the result is placed on the KBUSS 204. This result is the total amount of electricity being delivered at point 40.

Preferably, the loss calculations are placed on the IBUSS 200 (or other bus) for review or study by selected users or managers.

The compensator calculations of meter 14 are shown in further detail in FIGS. 4, 5A through 5I, and 6A and 6B.

Figure 4:
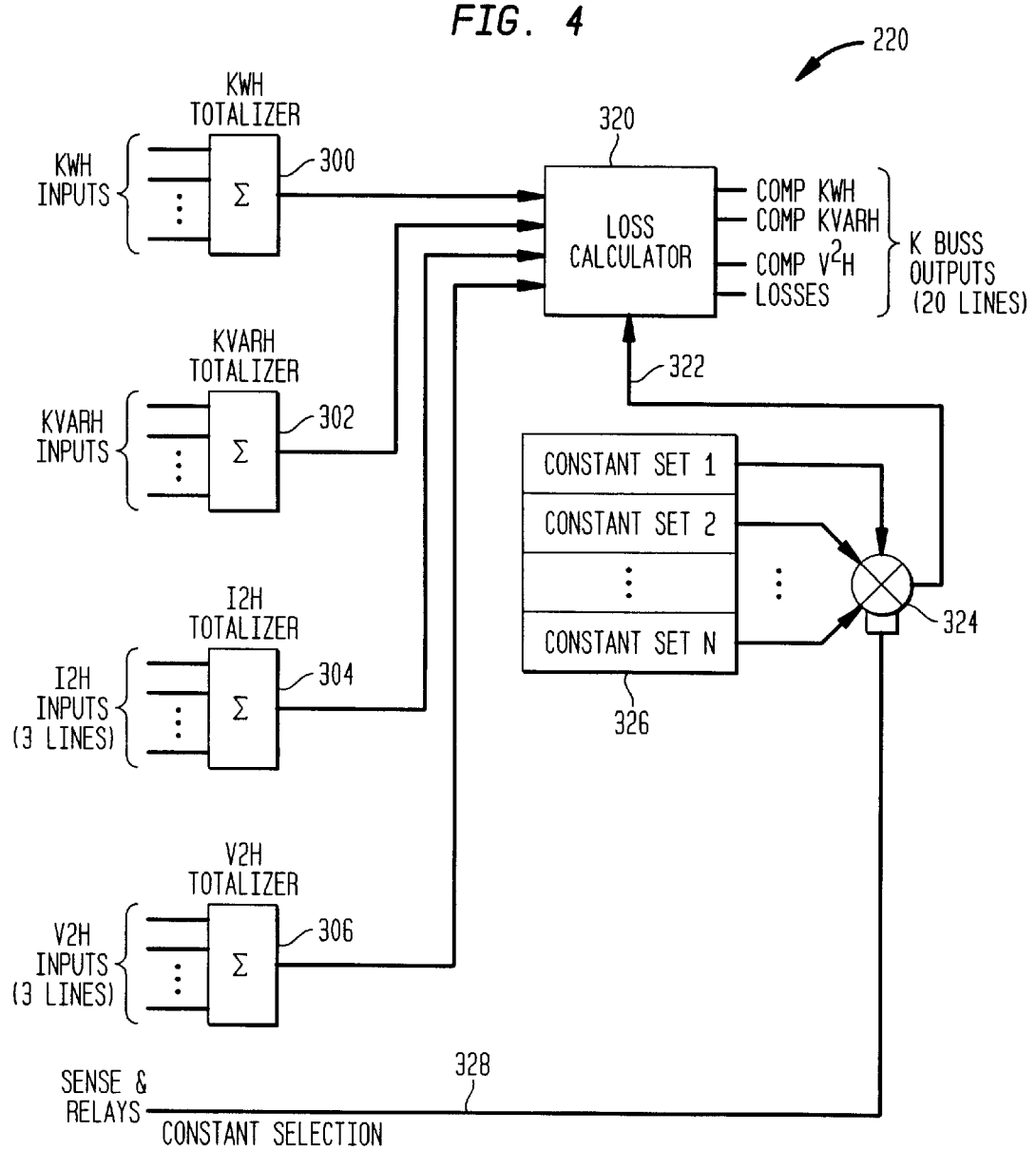
FIG. 4 is a schematic diagram of the compensator portion of the meter shown in FIG. 3 in accordance with the preferred embodiment of the present invention.

FIG. 4 shows a partial block schematic diagram of a compensator, for example, compensator 220, which performs the loss calculation for transformer 15. It is also representative of any compensator, such as compensator 222, or compensators in other meters, such as meters 18, 24 or 26.

Compensator 220 has a KWH totalizer 300 that sums the input KWHs received from each meter 14, 18 (which includes KWHs from meter 26) and 24 via the IBUSS 200. For this level of calculation, however, there are no other KWH inputs other than from what is metered by meter 14. The totalized KWHs are sent to loss calculator 320 in the compensator 220. The totalized KWHs are used to perform loss calculations and to calculate the delivered electricity after the loss device, which, in this example, is transformer 15.

Compensator 220 also receives KVARH information from each meter 14, 18 and 24 via the IBUSS 200. This information is summed in totalizer 302 and sent to loss calculator 320. The result is the net KVARHs input to transformer 15. For this level of calculation, there are no other KVARH inputs other than from what is metered by meter 14.

Similarly, compensator 220 receives $V^2H$ information from each meter 14, 18 and 24 via the IBUSS 200. For this level of calculation, there are no other $V^2H$ inputs other than from what is metered by meter 14. This information is summed in totalizer 304 and sent to loss calculator 320. The result is the net V2H input to transformer 15.

Finally, compensator 220 may receive $I^2H$ information from each meter 14, 18 and 24 via the IBUSS 200. For this level of calculation, there are no other $I^2H$ inputs other than from what is metered by meter 14. This information is summed in totalizer 306 and sent to loss calculator 320. The result is the net $I^2H$ input to transformer 15.

Compensator 220 has thus received and totalized the power information received from each meter. At this stage, it is determining the power information that is being delivered to the loss device (although, as will be seen below, the compensator can also handle and calculate power and loss information being received). For this example (e.g., transformer 15 level of loss calculation), however, the information made available from the other meters is not needed to calculate the transformer 15 loss.

Meter 14 thus knows the KWH, KVARH, $I^2H$ and $V^2H$ input to the low voltage side of transformer 15. Compensator 220 may place this totalized information onto communication bus 60, or, more particularly, onto TBUSS 202. This information is available to the other compensators and to selected users, such as the power generation facility 10, who may be interested in this information, or to selected other users or managers.

Compensator 220 then calculates the loss attributable to transformer 15. The totalized values from totalizers 300, 302, 304 and 306 were all input to loss calculator 320. Loss calculator 320 also has an input 322 coupled through switch 324 to constant table 326, which is part of memory 108. Constant table 326 stores the loss constants of related equipment, which include loss constants for transformer 15. Transformer 15 may have multiple loss constants depending upon, for example, which taps happen to be in use at the time of the loss calculation. As is known in the art, transformer 15 may have relay outputs, breaker contacts, or the like, that provide an output indicating which taps are selected. This output can be fed to switch 324 via line 328, and the switch 324 then selects the appropriate loss constant from table 326.

Line 328 may also supply auxiliary information to switch 324 and/or table 326 so that a user can select particular loss constants, review the loss constants, or make revisions or replacements to the loss constants.

After selecting the appropriate loss constants from table 326, switch 324 outputs the constants to loss calculator 320. Loss calculator then calculates the losses associated with transformer 15, sums them with the input information from the totalizers 300, 302, 304 and 306, and then outputs compensated information onto the KBUSS 204. This information is the power being delivered from the loss device. In this example, this is the power being delivered to point 30 from generator 12 less transformer 15 loss. Specifically, the output includes compensated KWH or COMP KWH, compensated KVARH or COMP KVARH, and compensated $V^2H$ or COMP $V^2H$.

The loss calculator 320 may also output information onto KBUSS 204 regarding the specific losses themselves, indicated by line LOSSES. This specific loss information may be useful to equipment owners or operators, or customers or managers. As will be seen below, additional information is also output from the compensator loss calculations and compensations.

Now the schematic of FIG. 4 will be explained using the calculations and compensations of compensator 222 of meter 14 as an example. Compensator 222 performs the calculations for the second level of losses attributable to transmission line 17. Since compensators 220 and 222 have the same components, the reference numerals of FIG. 4 will be used below for the description of compensator 222, with the understanding that totalizers 300, 302, 304, 306, loss calculator 320 and so on of FIG. 4 refer to compensator 222 instead of compensator 220.

In this example, the KWH totalizer 300 would sum the KWHs received from each meter 14, 18 (which includes KWHs from meter 26) and 24 via the IBUSS 200. The totalized KWHs are sent to loss calculator 320 in the compensator 222. The result is the net KWHs input to transmission line 17 at point 30.

Compensator 222 also receives KVARH information from each meter 14, 18 and 24 via the IBUSS 200. This information is summed in totalizer 302 and sent to loss calculator 320. The result is the net KVARHs input to transmission line 17.

Similarly, compensator 222 receives $V^2H$ information from each meter 14, 18 and 24 via the IBUSS 200. This information is summed in totalizer 304 and sent to loss calculator 320. The result is the net $V^2H$ input to transmission line 17.

Finally, compensator 222 may receive $I^2H$ information from each meter 14, 18 and 24 via the IBUSS 200. This information is summed in totalizer 306 and sent to loss calculator 320. The result is the net $I^2H$ input to transmission line 17.

Compensator 222 has thus received power information from each meter. Consequently, meter 14 knows the KWH, KVARH, $I^2H$ and $V^2H$ input to transmission line 17 at point 30. Compensator 222 may place this totalized information onto communication bus 60, or, more particularly, onto TBUSS 202. This information is available to the other compensators and to users, such as the power generation facility 10, who may be interested in this information, or to selected other users or managers.

Compensator 222 then calculates the loss attributable to transmission line 17. The totalized values from totalizers 300, 302, 304 and 306 were all input to loss calculator 320. Loss calculator 320 also has an input 322 coupled through switch 324 to constant table 326, which is part of memory 108. Constant table 326 stores the loss constants of related equipment, which include loss constants for transmission line 17. Transmission line 17 may have multiple loss constants depending upon, for example, the number of lines in use at the time of the loss calculation. As is known in the art, transmission line 17 may have relay outputs, breaker contacts, or the like, that provide an output indicating which lines are selected. This output can be fed to switch 324 via line 328, and the switch 324 then selects the appropriate loss constant from table 326.

Line 328 may also supply auxiliary information to switch 324 and/or table 326 so that a user can select particular loss constants, review the loss constants, or make revisions or replacements to the loss constants.

After selecting the appropriate loss constants from table 326, switch 324 outputs the constants to loss calculator 320. Loss calculator then calculates the losses associated with transmission line 17, sums them with the input information from the totalizers 300, 302, 304 and 306, and then outputs compensated information onto the KBUSS 204. This information is the power being delivered to point 40 from the transmission line 17. This is the power generated by generators 12 and 16, less the power consumed by plant loads 20 and 22, less the losses attributable to transformers 15, 19, 21 and 23, and less the loss attributable to transmission line 17. The output from loss calculator 320 includes compensated KWH or COMP KWH, compensated KVARH or COMP KVARH, and compensated $V^2H$ or COMP $V^2H$.

The loss calculator 320 may also output information onto KBUSS 204 regarding the specific losses themselves, indicated by line LOSSES. This specific loss information may be useful to equipment owners or operators, or customers or managers. As noted above, and as explained further below, additional information regarding the loss calculations and compensations is also output.

FIGS. 5A through 5I show a flowchart illustration of the calculations of FIG. 4 in more detail. More particularly, the flowchart of FIGS. 5A through 5I illustrate the steps of any compensator calculation.

Here at 700, a compensation calculation begins for one level of loss. In step 702, the meter sets the compensation level to 1. In step 704, the meter checks whether there is a compensation to be made. If there is a compensation to be made, the meter begins to totalize the inputs, as shown in step 706 where the KWHs are totalized.

Figure 5A:
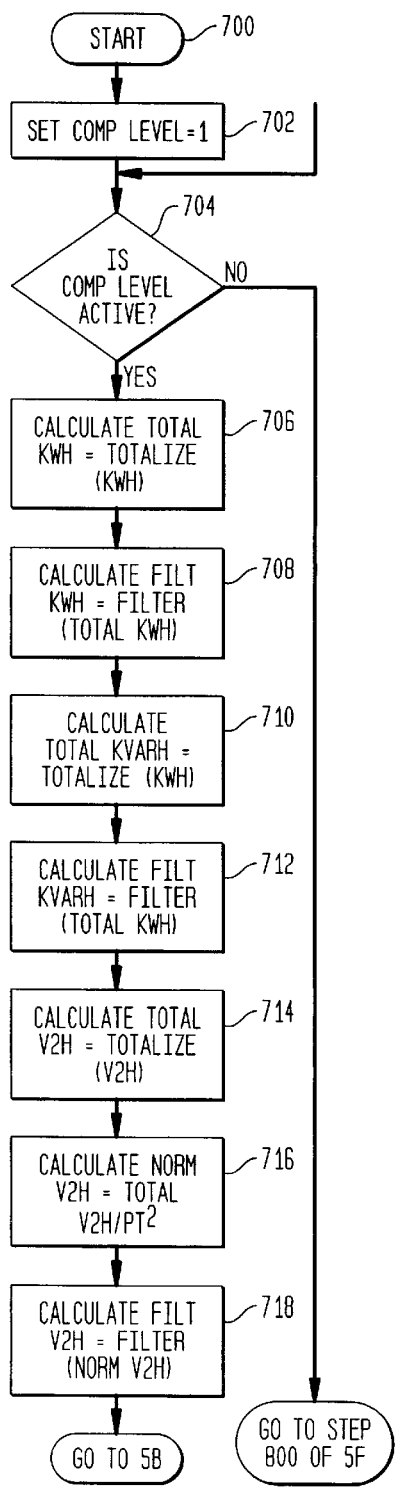
FIGS. 5A to 5I are flowchart diagrams of loss and compensation calculations performed by the meter in accordance with the preferred embodiment of the present invention.
Figure 5B:
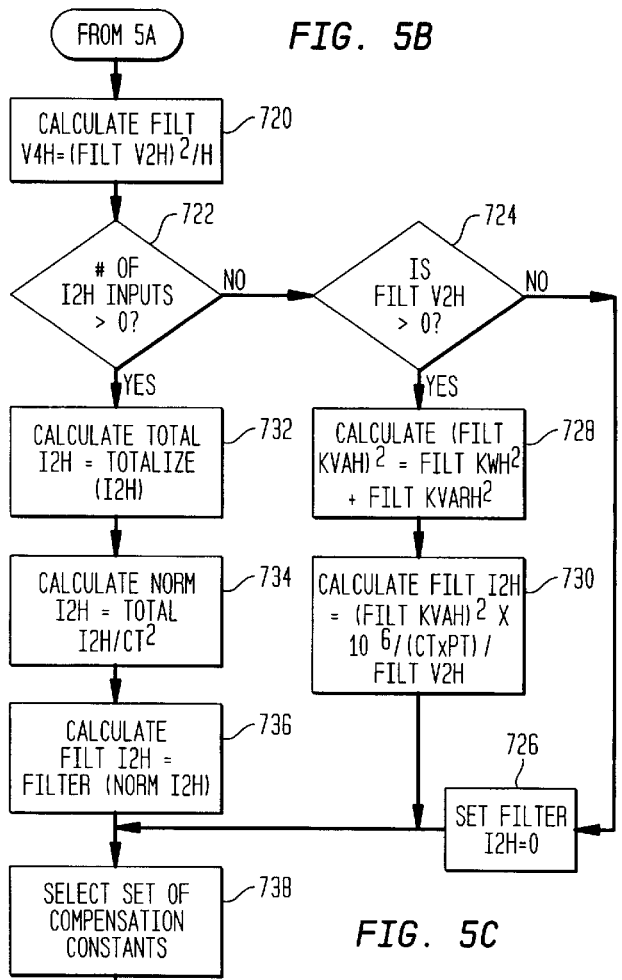
Figure 5C:
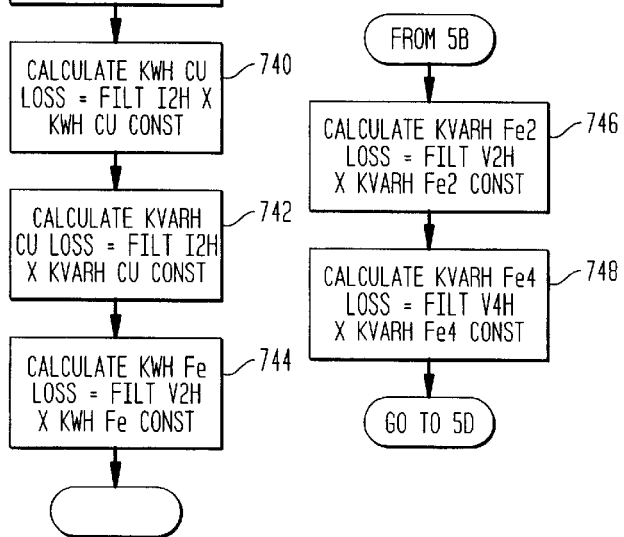
Figure 5D:
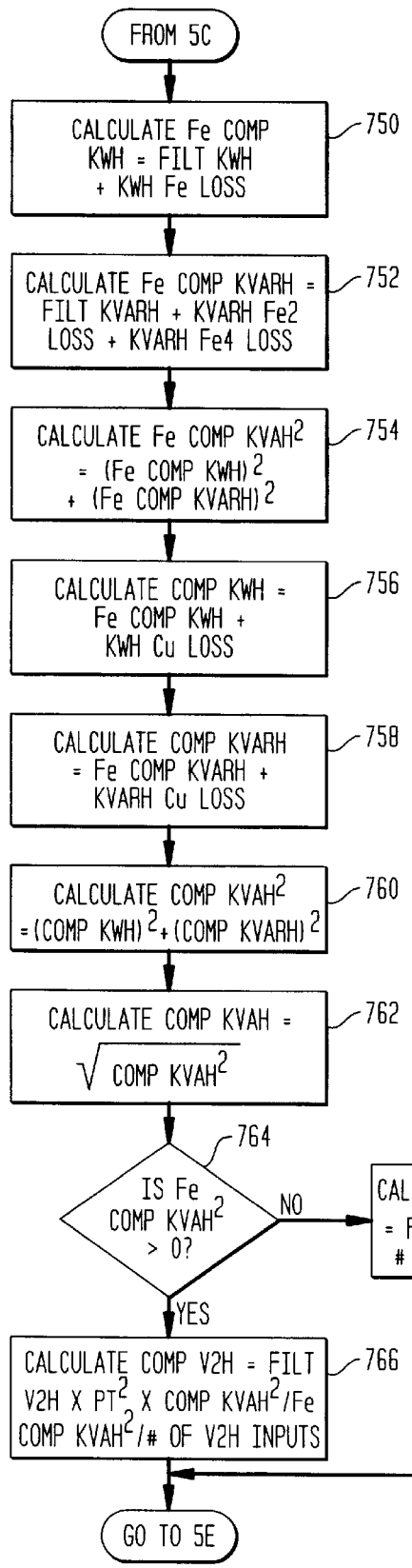
Figure 5E:
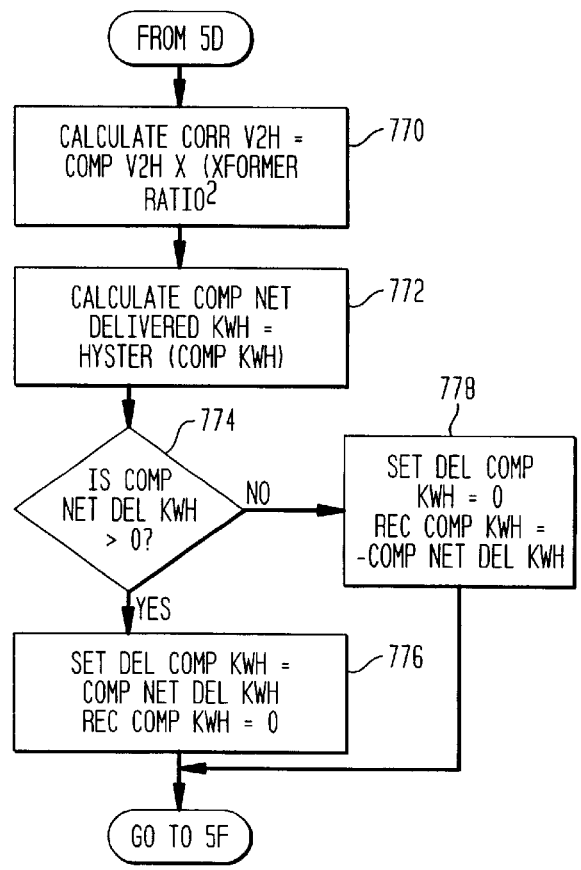
Figure 5F:
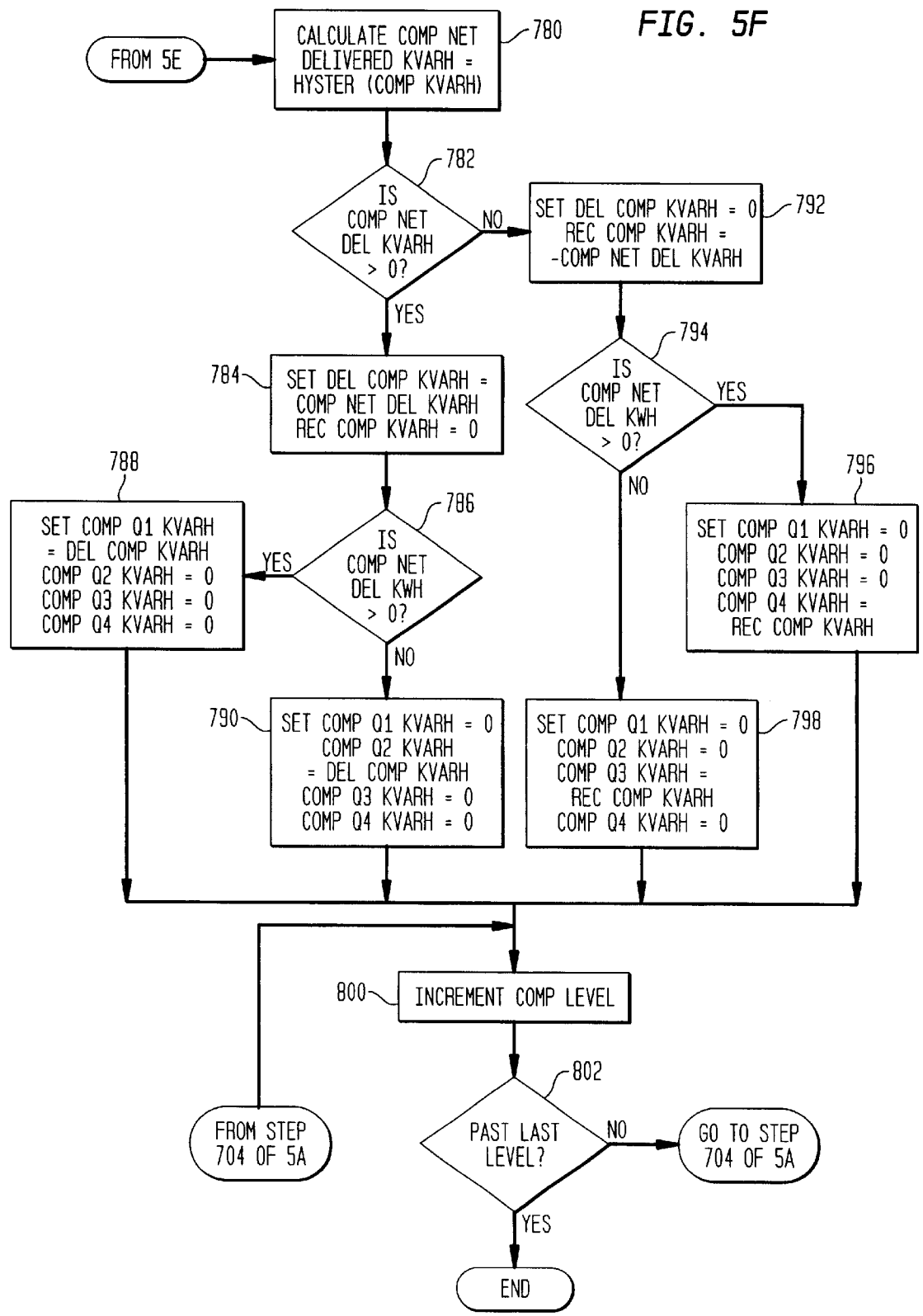
Figure 5G:
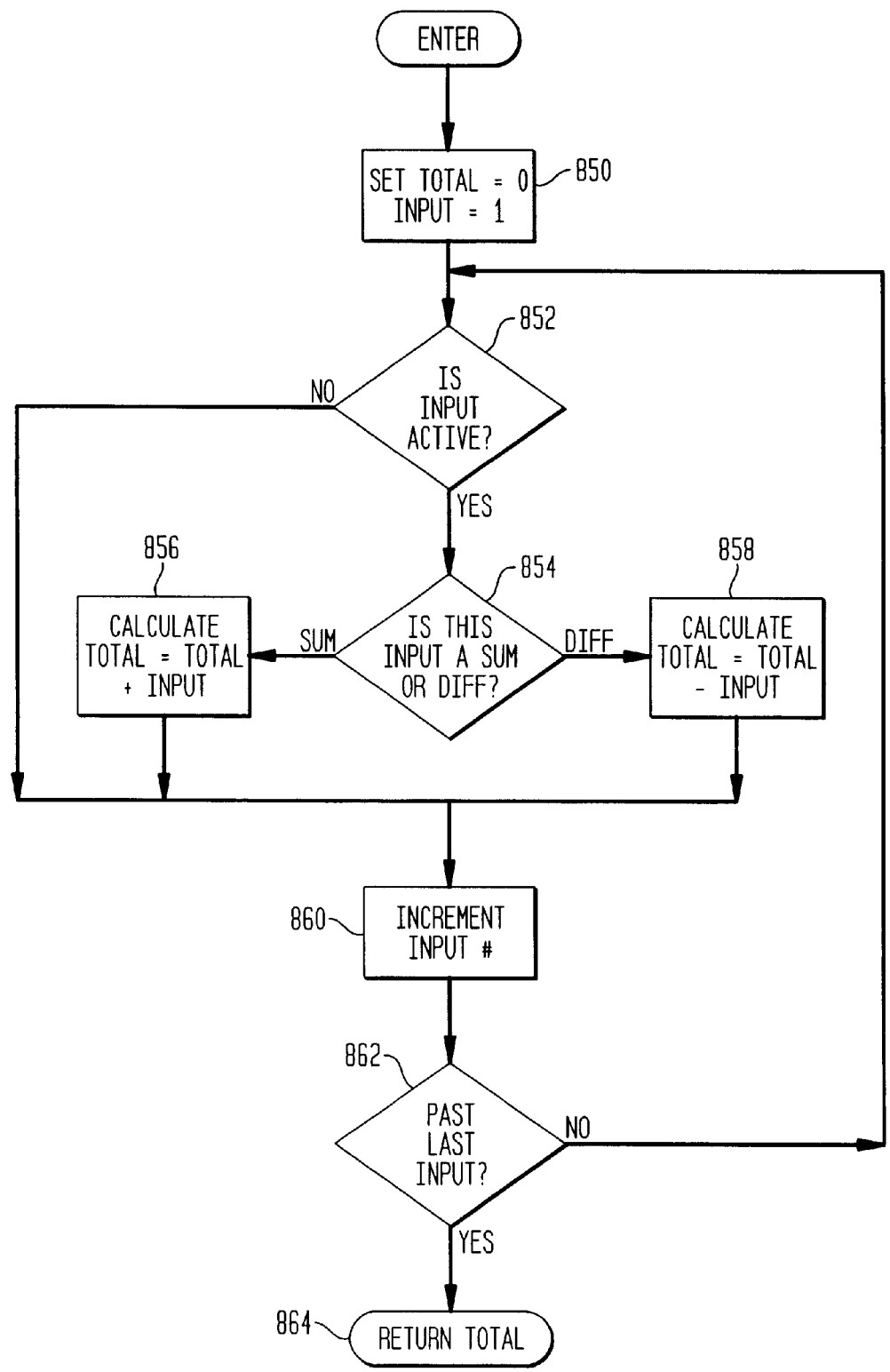

Totalization, such as the KWH totalization shown in step 706, is illustrated in FIG. 5G. This is how the compensator 220 or 222 (or any compensator) performs a totalization function. As shown in FIG. 5G at 850, the totalizer, such as the totalizer 300 of FIG. 4, sets the Total to 0 and the Input to 1. If there are one or more inputs, the input is active. Thus, for compensator 220 (which has one input active), the check for active inputs in step 852 would be "YES", and the totalizer 300 would then continue to step 854. In step 854, the totalizer determines which inputs are to be summed, and which are to be subtracted. This can be determined, for example, by the sign of the inputs. In this instance (compensator 220), the KWH inputs from meter 14 would be positive. Consequently, totalizer 300 would add or sum the KWH value from meter 14 to the total (which was initially set at 0 in step 850). This is done in step 856. The totalizer then increments the Input # to 2 in step 860, and checks whether it has past the last input in step 862, which it has since there is only one active input. Thus, the answer to step 862 is "YES", and the totalizer would then move to step 864 where it exits and returns the totalized value to compensator 220. Consequently, for compensator 220 and totalizer 300, the input KWH from meter 14, which is the only active input, would be output of totalizer 300 as TOTAL KWH.

For compensator 222 calculations, however, there would be three active inputs (one from meter 14, one from meter 24 and one from meter 18). Thus, in step 852, the totalizer would answer "YES", and would then continue to step 854. In step 854, the totalizer determines which inputs are to be summed, and which are to be subtracted. This can be determined, for example, by the sign of the inputs. The KWH inputs from meters 14 and 18, for example, would be positive, while the KWH input from meter 24 would be negative. Consequently, the totalizer would add or sum the KWH value from meter 14 to the total (which was initially set at 0 in step 850). This is done in step 856. Totalizer 300 then increments the Input # to 2 in step 860, checks whether it has past the last input in step 862 (which it has not since there are three active inputs), and returns to step 852.

The input #2 is valid (e.g., from meter 24), and thus totalizer 300 continues to step 854 where it determines this value is negative and thus is a DIFF. It then continues to step 854, where the KWH value from meter 24 is subtracted from the total. In step 860, the input is incremented to 3, and in step 862, the totalizer checks to see that 3 inputs are not past the last input of 3. The totalizer then returns to step 852.

In step 852, the totalizer checks to see whether the third input (e.g., from meter 18) is active. In this example (compensator 222), it is, so the totalizer proceeds to step 854. In this example, the KWH value from meter 18 is positive, so totalizer 300 adds this value to the running total in step 856. The totalizer then increments the input # to 4 in step 860 and checks whether this is past the last input, which it is. The totalizer then returns the calculated totalized value to the compensator 222 as the output of the totalizer (or TOTAL KWH).

Returning to FIG. 5A, in step 708, meter 14 performs a filtering operation on the TOTAL KWH value received from step 706 (and the totalization of FIG. 5G). This is a rolling average of the TOTAL KWH values.

Figure 5H:
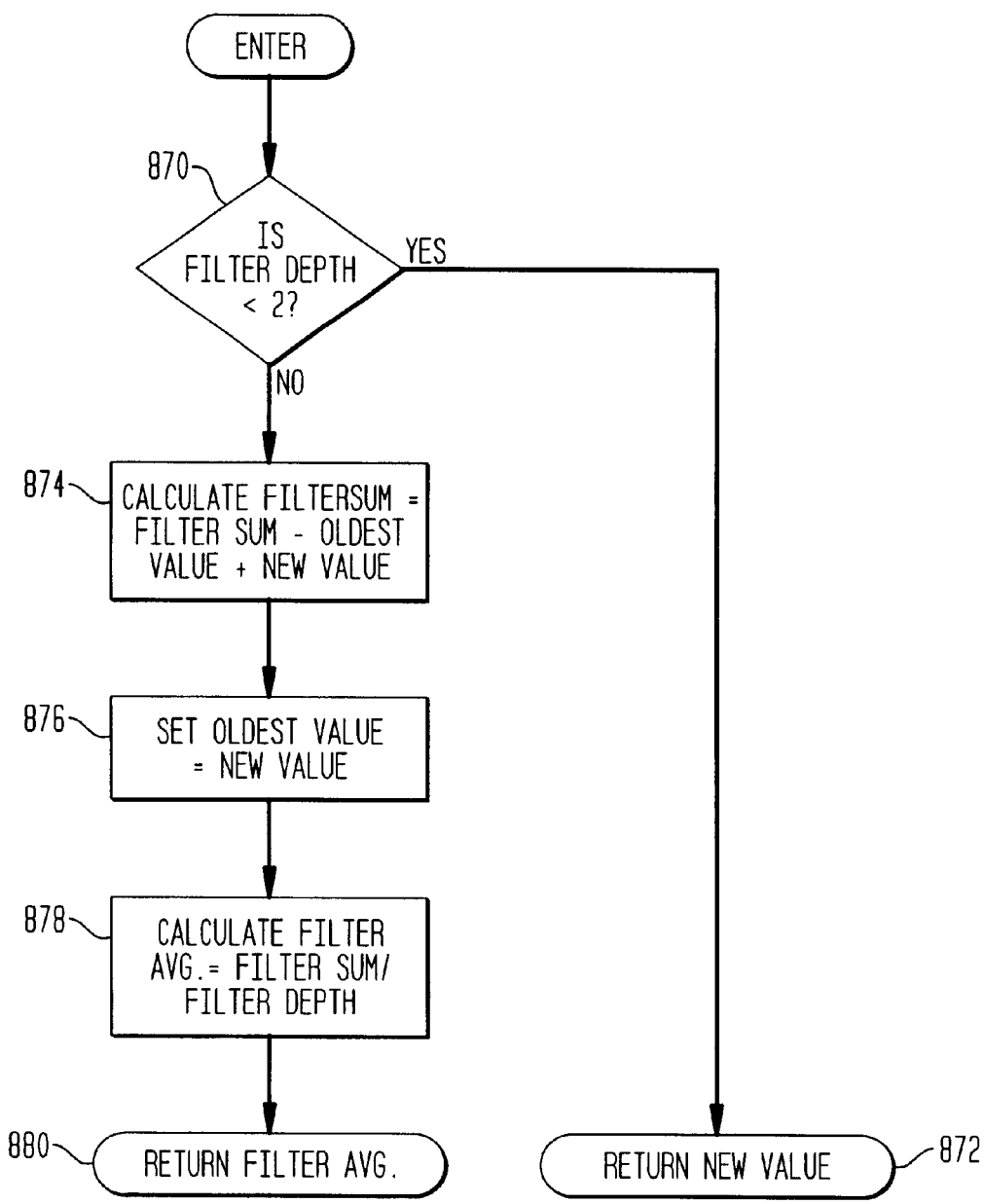

An example of a filtering operation is shown in FIG. 5H. Here at 870, the compensator (such as compensator 220 or 222) determines whether the filter has a depth less than 2 (if it is less than 2, then there is no average and thus no filtering). If the filter depth is less than 2, the compensator proceeds to step 872 and returns the value that was input to the filtering operation. If the filter depth is not less than 2, the compensator proceeds to step 874 where a rolling average calculation is begun. The rolling average is calculated by using a variable FILTERSUM. The variable FILTERSUM is set to the previously calculated FILTERSUM minus the next previously calculated TOTAL KWH ("oldest value"), plus the currently calculated TOTAL KWH ("new value"). In step 876, the oldest value is set to the new value. In step 878, the filter rolling average is set to FILTERSUM divided by the filter depth. In step 880, the filter returns this value the compensator (step 708).

Returning to FIG. 5A, the compensator then continues to step 710 where the TOTAL KVARH is calculated. Like the TOTAL KWH of step 706, the TOTAL KVARH of step 710 is calculated in the totalizer of FIG. 5G.

In step 712, the compensator calculates FILT KVARH. Also like the FILT KWH of step 708, this is calculated in the filter function of FIG. 5H.

In step 714, the compensator calculates TOTAL $V^2H$. This is a similar calculation to TOTAL KWH and TOTAL KVARH. This is also performed in the totalizer of FIG. 5G.

In step 716, the compensator calculates NORM $V^2H$. Here, the compensator normalizes $V^2H$ by dividing $V^2H$ with the potential transformer ratio squared.

In step 718, the compensator calculates FILT $V^2H$ using the normalized NORM $V^2H$ value calculated in step 716. Also like the FILT KWH of step 708 and the FILT KVARH of step 712, this is also calculated in the filter of FIG. 5H.

Turning to FIG. 5B, the compensator continues to step 720 where the compensator calculates FILT $V^4H$ using the formula shown and previously defined.

The compensator then determines $I^2H$ values. More particularly, in step 722, the compensator determines whether there are any $I^2H$ inputs, e.g., whether the meters have metered $I^2H$. If the number of $I^2H$ inputs is greater than zero, the compensator proceeds to step 732, where it calculates the current values. As explained further below, the compensator must know the current values to calculate losses.

If the number of $I^2H$ inputs was not greater than 0, then, in step 724, the compensator determines whether the FILT $V^2H$ calculated in step 718 is greater than zero. If it is not, then, in step 726, the compensator sets FILT $I^2H$ to zero. If FILT $V^2H$ is greater than zero, then the compensator calculates FILT $I^2H$ in steps 728 and 730. The compensator then continues to step 738.

Returning to step 722, if the compensator determined that the number of $I^2H$ inputs was greater than zero, e.g., that the meters metered this value, then the compensator totalizes $I^2H$ by calculating TOTAL $I^2H$. This calculation is similar to the calculation for TOTAL KWH, TOTAL KVARH and TOTAL $V^2H$. TOTAL $I^2H$ is also calculated in the totalizer of FIG. 5G.

The compensator in step 734 then normalizes $I^2H$ by calculating NORM $1^2H$ by dividing the TOTAL $I^2H$ with the current transformer ratio squared.

In step 736, the compensator calculates FILT $I^2H$ using the normalized NORM $I^2H$ value calculated in step 734. Also like the FILT KWH of step 708, the FILT KVARH of step 712 and the FILT $V^2H$ of step 718, this is also calculated in the filter of FIG. 5H.

Here at step 738, the compensator selects the appropriate loss constants for that level of compensation. The compensator then uses these loss constants to calculate the losses for that level. For example, if these calculations are being made by compensator 220, the loss constants for transformer 15 would be selected. If these calculations are being made by compensator 222, the loss, constants for transmission line 17 would be selected. When the loss constants are stored, all of the other, non-appropriate loss constants are set to zero. Thus, for example, if a transmission line calculation was being made, the KWH Fe CONSTANT would be set to zero (unless the transmission line 17 was a measurably leaky line for which it would be desirable to account for the Fe loss). Of course, the meter of the present invention is capable of making combined transformer and line loss calculation (if, for example, a transformer is coupled directly to a line and no totalization is required in the interim). In such a case, all of the loss constants would be non-zero.

In step 740, the compensator calculates the KWH Cu LOSS. In step 742, the compensator calculates the KVARH Cu LOSS. The KWH Fe LOSS is calculated in step 744.

Turning to FIG. 5C, the compensator calculates the KVARH $Fe^2$ LOSS in step 746, and the KVARH $Fe^4$ LOSS in step 748.

Turning to FIG. 5D, the compensator then begins its calculations of summing the losses with the original values. The result is compensated values. More particularly, in step 750, the compensator calculates Fe COMP KWH by summing the FILT KWH with the KWH Fe LOSS. In step 752, the compensator calculates Fe COMP KVARH by summing FILT KVARH, KVARH $Fe^2$LOSS and KVARH $Fe^4$. In step 754, the compensator calculates Fe COMP KVAH2. The compensator calculates COMP KWH in step 756 and COMP KVARH in step 758. COMP KVAH2 is calculated in step 760 and COMP KVAH is calculated in step 762.

In step 764, the compensator determines whether Fe COMP $KVAH^2$ from step 754 is greater than zero. If it is, compensator uses the formula set forth in step 766 (and also defined above) to calculate COMP $V^2H$. If COMP $KVAH^2$ is not greater than zero, then compensator uses the formula set forth in step 768 (and also defined above) to calculate COMP $V^2H$.

Turning to FIG. 5E, the compensator calculates a corrected $V^2H$, or CORR $V^2H$, in step 770. This is the actual voltage on the other side of the loss device (e.g., at point 30 if compensator 220 is making the calculation). This voltage value is useful for later loss calculations, and, in addition, some users may desire to know these voltage values downstream of equipment, which, pursuant to the invention, can be easily calculated rather than metered.

In step 772, the compensator calculates the compensated, net delivered KWH, or COMP NET DEL KWH. The compensator preferably uses a hysteresis function to calculate this value. The hysteresis function is set forth in FIG. 5I. Here, the hysteresis function sets up a "bucket", where the overflow of the bucket is used to make calculations. The bucket size is preferably proportional to the quantum size of the energy measurement, and is preferably about twice the quantum size of the energy measurement. For example, if the energy measurement is in range of 1 kw–hour, then the bucket size should be about 2 kw–hour.

In step 900, the new value, which in this example is COMP KWH, is added to the variable BUCKET TOTAL. In step 902, the BUCKET TOTAL is compared to the BUCKET SIZE, if the TOTAL is greater than the SIZE, then the hysteresis function calculates the OVERFLOW in step 904. The BUCKET TOTAL is then set to the BUCKET SIZE in step 906, and the OVERFLOW is returned to the compensator for calculations. If, in step 902, the BUCKET TOTAL was not greater than the BUCKET SIZE, then the hysteresis function in step 908 determines whether the BUCKET TOTAL is less than the negative of BUCKET SIZE. If it is not, the hysteresis function sets OVERFLOW to zero in step 910 and returns this value to the compensator for calculations. If in step 908 the BUCKET TOTAL is less than the negative of BUCKET SIZE, then the hysteresis function calculates OVERFLOW in step 912, and sets the BUCKET TOTAL to negative the BUCKET SIZE in step 914. The OVERFLOW is then returned to the compensator for calculations.

Figure 5I:
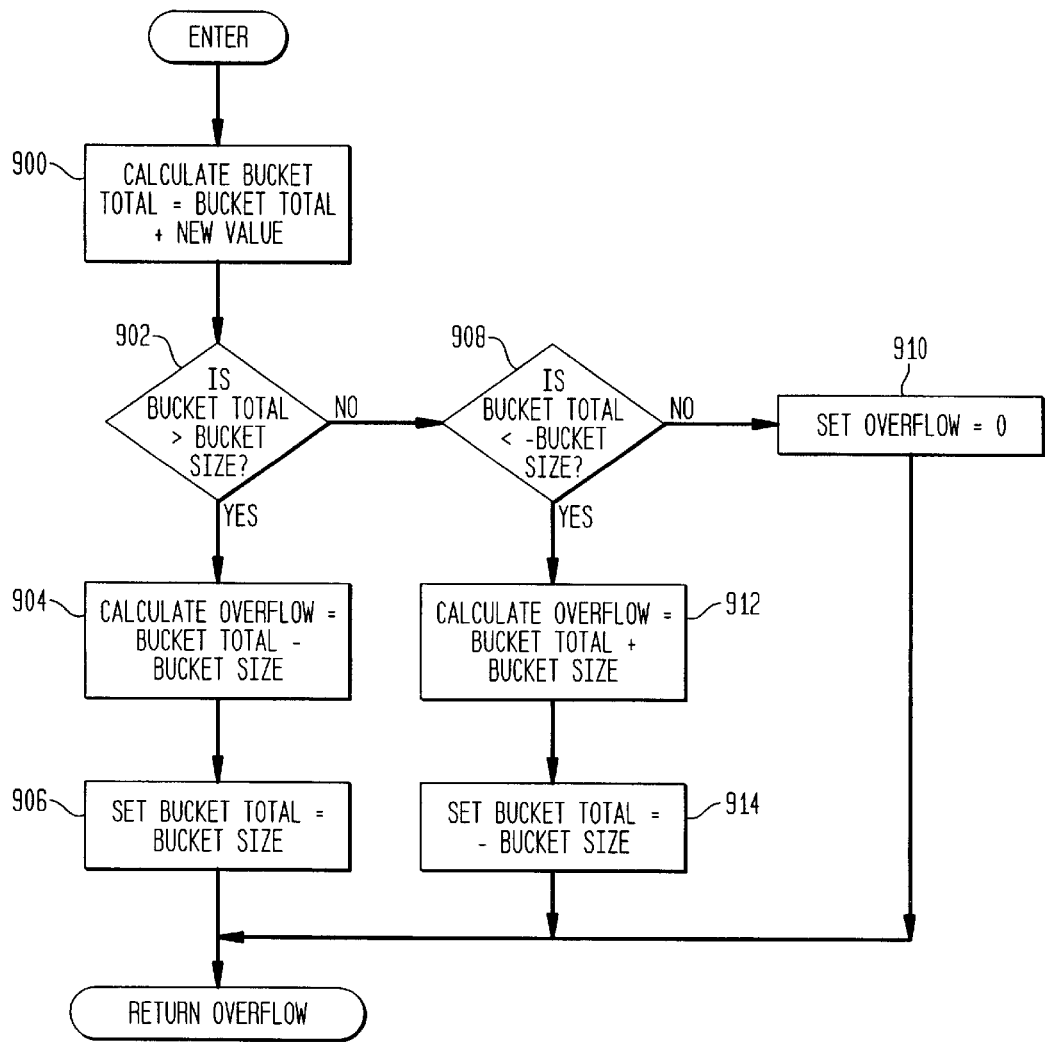

After the hysteresis function of FIG. 5I calculates the OVERFLOW, it is returned to step 772 where the COMP NET DEL KWH is calculated by the compensator. In step 774, the compensator determines whether the COMP NET DEL KWH is greater than zero (whether COMP NET DEL KWH is being delivered or received). If it is greater than zero, then the compensator in step 776 sets DEL COMP KWH to COMP NET DEL KWH, and sets REC COMP KWH to zero. If, in step 774, COMP NET DEL KWH was not greater than zero, then the compensator in step 778 sets DEL COMP KWH to zero and sets REC COMP KWH to negative COMP NET DEL KWH.

Turning to FIG. 5F, the compensator calculates COMP NET DEL KVARH in step 780. Like COMP NET DEL KWH in step 772, this uses the hysteresis function of FIG. 5I.

In step 782, the compensator determines whether the COMP NET DEL KVARH is greater than zero. If it is, the compensator in step 784 sets DEL COMP KVARH to COMP NET DEL KVARH, and sets REC COMP KVARH to zero.

The compensator then determines which quadrant to place the COMP NET DEL KVARH into. In step 786, the compensator determines whether the COMP NET DEL KWH is greater than zero. If it is, then, in step 788, the compensator sets COMP Q1 KVARH to DEL COMP KVARH, and sets the other quadrants to zero, i.e., COMP Q2 KVARH, COMP Q3 KVARH and COMP Q4 KVARH to zero. If, in step 786, COMP NET DEL KWH is not greater than zero, then, in step 790, the compensator sets COMP Q2 KVARH to DEL COMP KVARH, and sets the other quadrants to zero.

If, in step 782, the COMP NET DEL KVARH is not greater than zero, then the compensator in step 792 sets DEL COMP KVARH to zero and sets REC COMP KVARH to COMP NET DEL KVARH. In step 794, the compensator determines whether COMP NET DEL KWH is greater than zero. If it is, then the compensator in step 796 sets COMP Q4 KVARH to REC COMP KVARH and the other quadrants to zero. If, in step 794, the COMP NET DEL KWH is not greater than zero, then the compensator in step 798 sets COMP Q3 KVARH to REC COMP KVARH and sets the other quadrants to zero.

Finally, the compensator continues to step 800 where it increments the compensation level. Meter 14, for example, has two levels of compensation (one for transformer 15, and one for transmission line 17). If the above compensation loop of FIGS. 5A through 5I were performed for the first level of compensation (e.g., by compensator 220), then the compensation level would be incremented to 2 in step 800. Also, in step 802, meter 14 would check to see that level 2 is not past its last level (of 2), and would then proceed to step 704 of FIG. 5A where it would check to make sure level 2 is active. It is (but if it were not, meter 14 would return to step 800). Meter 14 would then perform the loop of FIGS. 5A through 5I for compensation level 2 to calculate and compensate for the losses due to transmission line 17. When it has completed those calculations, it would then increment the compensation level to 3 in step 800. It would then determine that it is past the last level in step 802 and end, or, more accurately, wait to be called again for the next calculations.

Figure 6A:
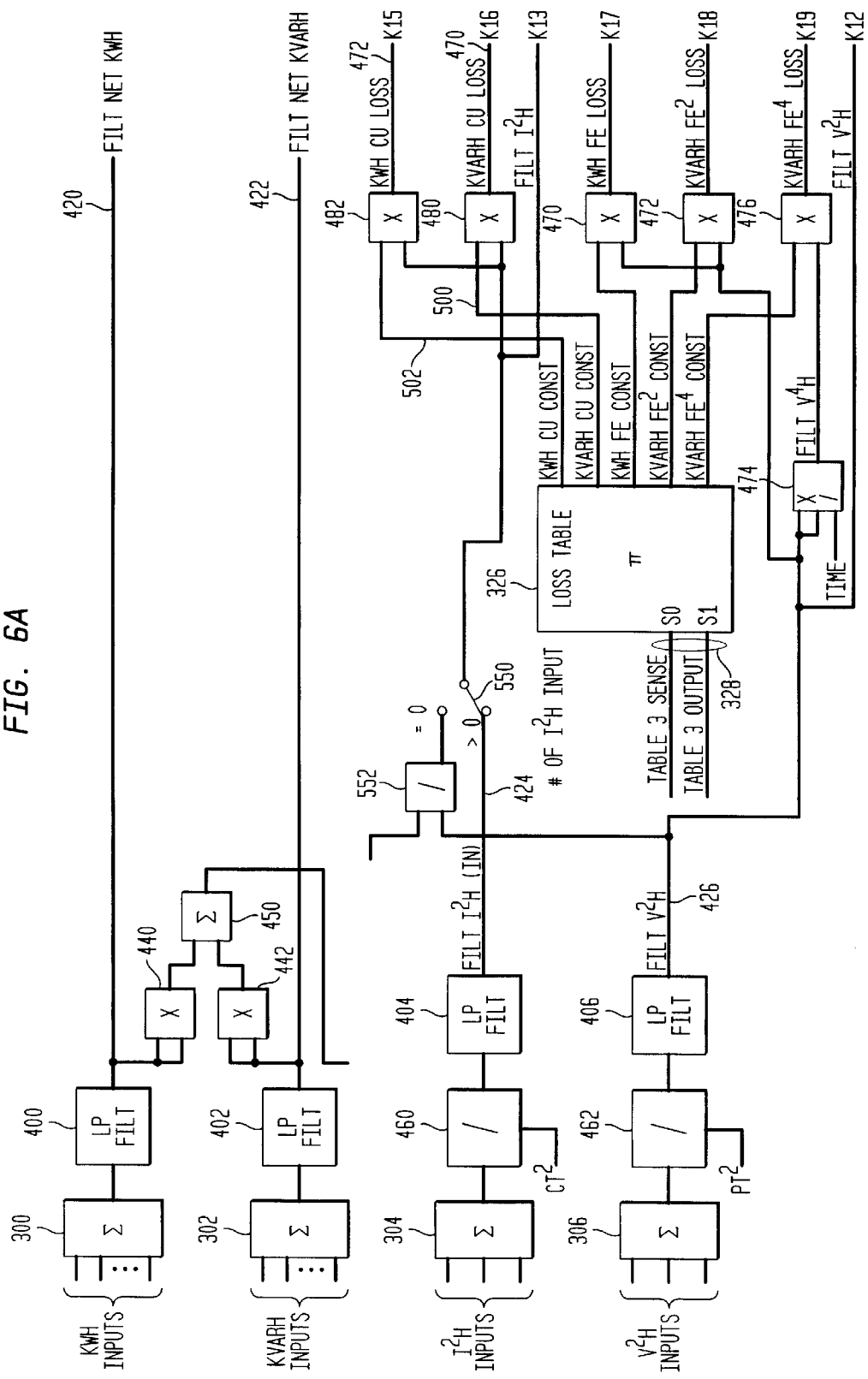
FIGS. 6A and 6B are schematic diagrams of loss and compensation calculations performed by the meter in accordance with the preferred embodiment of the present invention.
Figure 6B:
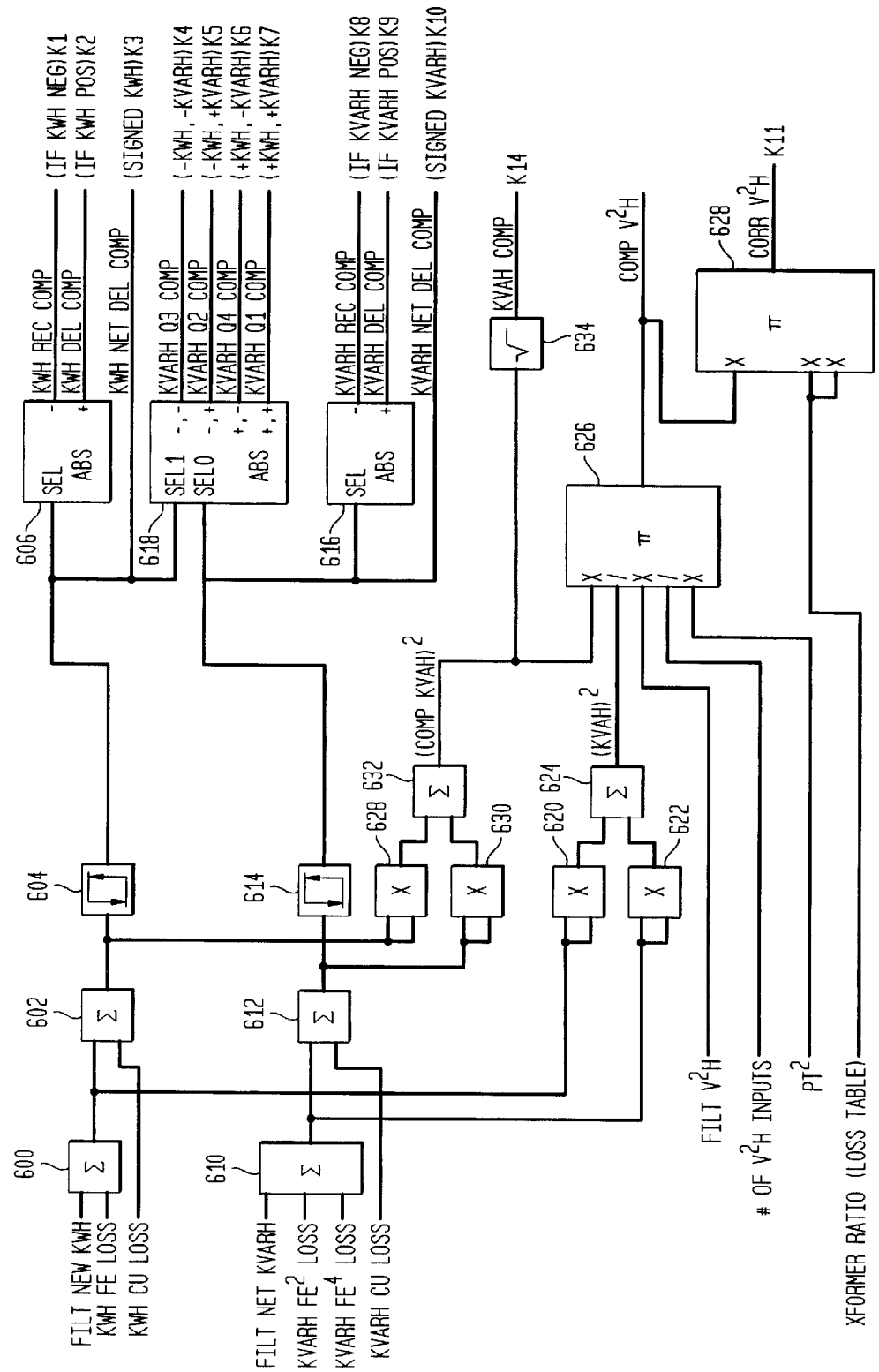

Turning now to FIGS. 6A and 6B, the calculations illustrated in FIGS. 5A through 5I are shown in block schematic diagram.

The KWH totalized output of totalizer 300, or the net KWH, is passed through a low pass filter 400 to improve the signal. The result is FILT NET KWH 420. Similarly, the KVARH output of totalizer 302, or the net KVARH, is passed through a low pass filter 402. The result is FILT NET KVARH 422.

As shown in FIG. 6B, and as explained further below, the FILT NET KWH signal 420 is then summed with calculated losses to arrive at compensated KWH information. Similarly, the FILT NET KVARH signal 422 is summed with losses to arrive at compensated KVARH information.

The output of totalizer 304, which is the net $I^2H$ signal, is divided by the current transformer ratio squared in divider 460, and then passed through low pass filter 404. The output of filter 404 is the FILT $I^2H$ signal 424. This signal is placed on the KBUSS 204. The FILT $I^2H$ signal 424 is also used to calculate the KVARH copper-related loss, or KVARH Cu LOSS 470, and the KWH copper-related loss, or KWH Cu LOSS 472.

The KVARH Cu LOSS 470 is calculated by multiplying the FILT $I^2H$ signal with the KVARH Cu LOSS CONSTANT 500 selected from loss table 326. This CONSTANT 500 can be pre-stored or pre-programmed in the loss table 326, or input via line 328. As shown in FIG. 6A, line 328 is a two-line logic input. This logic input is used to select the appropriate loss constant from table 326. Switch 324 of FIG. 4 is thus replaced in FIG. 6A by a logic input, which performs the same function. CONSTANT 500 is multiplied with the FILT I2H signal 424 in multiplier 480. The resulting signal is indicative of the KVARH copper-related loss due to losses caused by transformer 30. This signal, KVARH Cu LOSS, is placed on the KBUSS.

Similarly, the KWH copper-related losses are calculated by multiplying the FILT I2H signal 424 with the KWH Cu LOSS CONSTANT 502 in multiplier 482. CONSTANT 502 can be pre-stored or pre-programmed in the loss table 326, or input via lines 328. The resulting signal, KWH Cu LOSS, is placed on the KBUSS.

As noted above, KVARH and KWH Cu CONSTANTS 500 and 502 may change depending upon the particular set up of a transformer, for example, different tap positions. Therefore, multiple Cu constants may be stored in loss table 326 depending, for example, on tap positions. The particular copper constant selected for multiplication by multipliers 480 and 482 can be determined by input line 328. The information for input 328 can be automatic, for example, if line 328 is coupled to a relay or sensor that outputs a signals indicative of the tap position. Alternatively, the information for line 328 may be input manually.

Turning to the totalized $V^2H$ signal output by totalizer 306, this value is divided by the voltage transformer ratio squared divider 462. The output of divider 462 is passed through a low pass filter 406, and the resulting signal is the FILT V2H signal 426. This signal is placed on the KBUSS 204.

The FILT $V^2H$ signal 426 is also used to calculate current in situations where there are no $I^2H$ input signals. In such situations, switch 550 connects to the output of divider 552. Divider 552 divides a signal indicative of KWH squared summed with KVARH squared with the FILT $V^2H$ signal 426.

In other words, in order to calculate an $I^2H$ value in situations where $I^2H$ is not metered, compensator 200 squares the FILT NET KWH signal 420 in multiplier 440. Compensator 200 also squares the FILT NET KVARH signal 422 in multiplier 442. These two values are then summed in summer 450. The resultant value is divided by the FILT $V^2H$ signal in divider 552, which outputs a FILT $I^2H$ signal (which is needed to calculate certain losses).

In situations where $I^2H$ is metered, this current calculation is not necessary, and switch 550 is placed in the position shown in FIG. 6A.

The FILT $V^2H$ signal 426 is also used to calculate iron-related losses. The $V^2H$ value is multiplied with the KWH FE loss constant from loss table 326 in multiplier 470. This results in the KWH FE LOSS signal, which is placed on the KBUSS.

The FILT $V^2H$ signal is also multiplied with the KVARH $FE^2$ loss constant from loss table 326 in multiplier 472. This results in the KVARH $FE^2$ LOSS, which is placed on the KBUSS.

The KVARH $FE^4$ loss is calculated by squaring the FILT $V^2H$ signal in multiplier-divider 474 and then divided by a time-normalizing factor so that multiplier-divider 474 outputs $V^4H$. $V^4H$ is then multiplied with the KVARH $FE^4$ LOSS CONSTANT from loss table 326 in multiplier 476. This results in the KVARH $FE^4$ LOSS, which is placed on the KBUSS.

Turning to FIG. 6B, compensated KWH, KVARH and $V^2H$ are calculated to determine the power delivered at point 30 or 40 (depending upon the level of loss being calculated). The FILT NET KWH signal is summed with the KWH FE LOSS signal in summer 600 to subtract the iron-related losses from KWH. The output from summer 600 is summed with the KWH CU LOSS signal in summer 602 to subtract the copper-related losses from KWH. The output of summer 602 is passed through hysteresis 604 which accounts for the output from summer 602 being received in segments. The output of hysteresis 604 is the KWH NET DEL COMP delivered after the loss device. This value is placed on the KBUSS 204 as signal KWH NET DEL COMP.

The output of hysteresis 604 is also sent to selector 606, which outputs one of two signals depending upon the value of the input. If the input is positive, selector 606 outputs the absolute value of compensated KWH delivered, or KWH DEL COMP. If the input is negative, selector 606 outputs the absolute value of compensated KWH received, or KWH REC COMP. The output of selector 606 is placed on the KBUSS 204.

The FILT NET KVARH is summed with the KVARH $FE^2$ LOSS and KVARH $FE^4$ LOSS in summer 610. This subtracts the iron-related losses from the net KVARH. The output of summer 610 is sent to summer 612 and summed with KVARH CU LOSS. This subtracts the copper-related losses from KVARH. The output of summer 612 is passed through hysteresis 614 because this output from summer 612 is received in segments. The output of hysteresis 614 is the net compensated KVARH. This signal, KVARH NET DEL COMP, is placed on the KBUSS 204.

The output of hysteresis 614 is also sent to selector 616, which outputs one of two signals depending upon the value of the input. If the input is positive, selector 616 outputs the absolute value of compensated KVARH delivered, or KVARH DEL COMP. If the input is negative, selector 616 outputs the absolute value of compensated KVARH received, or KVARH REC COMP. The output of selector 616 is placed on the KBUSS 204.

The outputs of both hysteresis 604 and 614 are sent to selector 618, which outputs one of four KVARH signals depending upon the values of the inputs. Using the values of the inputs, the selector 618 places the KVARH signal in the proper quadrant. For example, if the KWH signal received from hysteresis 604 is negative, then the KVARH received from hysteresis will be in the third quadrant if it is negative, or in the second quadrant if it is positive. Thus, if the received compensated KWH signal if negative, and the received compensated KVARH signal is negative, selector 618 outputs the absolute value of the received KVARH signal on a line that indicates the KVARH signal is in the third quadrant. This signal is identified as KVARH Q3 COMP and is placed on the KBUSS 204.

If selector 618 receives a compensated KWH signal that is negative, and receives a compensated KVARH signal that is positive, selector 618 outputs the absolute value of the received KVARH signal on a line that indicates the KVARH signal is in the second quadrant. This signal is identified as KVARH Q2 COMP and is placed on the KBUSS 204.

Similarly, if selector 618 receives a compensated KWH signal that is positive, and receives a compensated KVARH signal that is negative, selector 618 outputs the absolute value of the received KVARH signal on a line that indicates the KVARH signal is in the fourth quadrant. This signal is identified as KVARH Q4 COMP and is placed on the KBUSS 204.

If the selector 618 receives a compensated KWH signal that is positive, and receives a compensated KVARH signal that is positive, selector 618 outputs the absolute value of the received KVARH signal on a line that indicates the KVARH signal is in the first quadrant. This signal is identified as KVARH Q1 COMP and is placed on the KBUSS 204.

The compensator also performs a calculation to determine the actual voltage delivered after the loss device. $KVAH^2$ is calculated by squaring the output of summer 600 in multiplier 620 and squaring the output of summer 610 in multiplier 622. This value is summed in summer 624. This results in $KVAH^2$, which is sent as an input to calculator 626.

Compensated $KVAH^2$ is calculated by squaring the output of summer 602 in multiplier 628 and squaring the output of summer 612 in multiplier 630. These two values are then summed in summer 632. The result is COMP $KVAH^2$, which is sent as an input to calculator 626.

A compensated KVAH value is calculated by taking the square root of the compensated KVAH2 value in block 634. The compensated KVAH value, or COMP KVAH, is output on the KBUSS 204.

To determine the average $V^2H$ compensated value, calculator 626 divides the compensated $KVAH^2$ signal COMP $KVAH^2$ with the $KVAH^2$ signal. This value is then multiplied with the net filtered V2H signal 426, which is divided by the number of $V^2H$ inputs (i.e., the number of inputs to totalizer 306), which is then multiplied with the potential transformer ratio squared.

The output of calculator 626 is the average compensated $V^2H$ value, COMP V2H, which is placed on the KBUSS 204.

The output of calculator 626 is also input to calculator 628, which calculates a corrected average compensated $V^2H$ value based on the transformer ratio. The calculator 626 multiplies the COMP $V^2H$ value with the square of the transformer ratio constant (from loss table 326). This results in the corrected compensated average $V^2H$, or CORR $V^2H$. This value is also placed on the KBUSS 204.

Consequently, the compensator has received inputs indicative of metered power values. Using this information, it has netted the power values to arrive at power being delivered at one location (e.g., prior to the loss device). It then subtracted losses from these values due to the loss device (e.g., transformer 15). Compensator 220 thus arrived at power values being delivered at another location after the loss device, and also calculated loss values and other informational signals.

Meter 14 would then proceed to calculate the losses and compensate for the losses for the next level of loss (e.g., transmission line 17). It would then go through the same calculations shown in FIGS. 6A and 6B (or the flowcharts of FIGS. 5A through 5I) to calculate these losses and compensations.

Of course, any number of loss-levels can be accounted for simply by increasing the number of compensators used in any meter. Moreover, any meter or combination of meters in the system could make these loss calculations, provided it receives appropriate power information from other meters.

Furthermore, the terms compensator, loss calculator, and totalizer refer not only to the specific embodiments described above, but to other devices having input/output characteristics comparable to the described embodiments.

While one embodiment of a multi-level transformer and line-loss compensation meter and several modifications thereof have been described in detail herein, various other changes and modifications may be made without departing from the scope of the present invention.

What is claimed is:

1. A compensator for computing compensation level losses in an electrical energy transmission system including devices to which electrical energy losses can be attributed, the compensator coupled to a meter at a first point in the system and in communication with at least one other meter each at a respective point at the system distal from the first point, the compensator comprising:

at least one totalizer programmed to receive at least one input relating to a measure of electricity information, to compute a total value of that electricity information, and to output that value;

a memory device containing at least one loss constant corresponding to a loss device; and a loss calculator coupled to the at least one totalizer for receiving an output therefrom, and to the memory device for receiving the at least one loss constant therefrom, and programmed for computing an electrical energy loss value based on the outputs received from the at least one totalizer and from the memory device.

2. The compensator according to claim 1, wherein the loss calculator is further programmed to conduct a filtering operation on data received from the at least one totalizer.

3. The compensator according to claim 2, wherein the filtering step comprises a rolling average calculation.

4. The compensator according to claim 1, further comprising a switch coupled to the memory device and adapted for:

receiving loss device information;

selecting an appropriate loss constant from the memory device corresponding to the received loss device information; and providing the selected loss constant to the loss calculator.

5. The compensator according to claim 1, wherein the at least one totalizer receives a plurality of inputs each carrying information relating to a loss device.

6. The compensator according to claim 1, wherein the at least one totalizer comprises a plurality of totalizers, each totalizer corresponding to at least one compensation level for the system.

7. A compensation method for use in an electrical energy meter coupled to an electrical energy network including loss devices, the energy meter making at least one measurement relating to electrical energy, and the method compensating the at least one measurement for electrical energy loss due to at least one of the loss devices, the method comprising the steps of:

selecting a compensation level of the network;

determining whether a compensation corresponding to the selected level is to be made to the at least one measurement relating to electrical energy;

totalizing the electrical energy measure for at least one of the loss devices; and calculating, based on the result of the totalization step, a loss for the selected level and attributable to the at least one loss device.

8. The method according to claim 7, wherein the step of totalizing the measure of electricity information by computing a total value of that electricity information, the method comprising the steps of:

determining a set of inputs corresponding to the measure of electricity information;

for each input, determining whether the input is to be summed or subtracted; and for each input, if the input is to be summed, adding the value of the input to a total value, otherwise subtracting it from the total value.

9. The method according to claim 8, wherein the determination as to which inputs are summed, and which subtracted, is based on the mathematical sign of the input.

10. The method according to claim 7, further including a filtering operation on the result received from the totalization step.

11. The method according to claim 10, wherein the filtering operation includes the steps of:

determining whether the filter depth is less than two; and computing a rolling average of results received from the totalization step.

* * * * *